United States Patent
Abe et al.

(10) Patent No.: US 9,521,604 B2
(45) Date of Patent: Dec. 13, 2016

(54) USER TERMINAL, RADIO BASE STATION AND RADIO COMMUNICATION METHOD

(75) Inventors: Tetsushi Abe, Tokyo (JP); Satoshi Nagata, Tokyo (JP); Nobuhiko Miki, Tokyo (JP); Naoto Ookubo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 465 days.

(21) Appl. No.: 13/883,426

(22) PCT Filed: Nov. 8, 2011

(86) PCT No.: PCT/JP2011/075659
§ 371 (c)(1),
(2), (4) Date: Aug. 5, 2013

(87) PCT Pub. No.: WO2012/063793
PCT Pub. Date: May 18, 2012

(65) Prior Publication Data
US 2013/0308607 A1    Nov. 21, 2013

(30) Foreign Application Priority Data
Nov. 9, 2010    (JP) .................................. 2010-250874

(51) Int. Cl.
*H04W 36/30* (2009.01)
*H04W 68/02* (2009.01)
(Continued)

(52) U.S. Cl.
CPC ........... *H04W 36/30* (2013.01); *H04B 17/318* (2015.01); *H04L 5/0096* (2013.01); *H04W 68/02* (2013.01);
(Continued)

(58) Field of Classification Search
CPC .. H04W 52/244; H04W 28/048; H04B 17/318
See application file for complete search history.

(56) References Cited

U.S. PATENT DOCUMENTS

| | | | | |
|---|---|---|---|---|
| 8,644,861 B1 * | 2/2014 | Greenberg | .............. | H04W 4/08 455/426.1 |
| 2011/0171929 A1 * | 7/2011 | Tamura et al. | ............ | 455/404.1 |

(Continued)

FOREIGN PATENT DOCUMENTS

| | | |
|---|---|---|
| CA | 2677551 A1 | 8/2008 |
| WO | 2010032477 A1 | 3/2010 |

OTHER PUBLICATIONS

WO/2010/032477.*

(Continued)

*Primary Examiner* — Jeffrey M Rutkowski
*Assistant Examiner* — Thomas D Busch
(74) *Attorney, Agent, or Firm* — Osha Liang LLP

(57) ABSTRACT

In order to transmit a paging to a user terminal with high quality, transmit a CSI-RS effectively and perform UL HARQ efficiently in HetNet, the present invention provides a radio communication method having the steps of: a micro base station which is arranged in a macro cell and forms a smaller micro cell than the macro cell, transmitting, to a user terminal, a signal having a CSI-RS subframe including a CSI-RS and a paging subframe including modification notification information indicating modification in system information and a control signal indicating not to measure a CSI-RS when the CSI-RS subframe and the paging subframe collide with each other; and the user terminal determining a CSI-RS subframe to measure the CSI-RS based on the control signal when the CSI-RS subframe and the paging subframe collide with each other.

7 Claims, 10 Drawing Sheets

(51) Int. Cl.
*H04B 17/318* (2015.01)
*H04W 36/04* (2009.01)
*H04L 5/00* (2006.01)
*H04W 52/40* (2009.01)
*H04B 17/382* (2015.01)

(52) U.S. Cl.
CPC ............ *H04B 17/382* (2015.01); *H04L 5/005* (2013.01); *H04L 5/0007* (2013.01); *H04L 5/0053* (2013.01); *H04L 5/0073* (2013.01); *H04W 36/04* (2013.01); *H04W 52/40* (2013.01)

(56) References Cited

U.S. PATENT DOCUMENTS

| | | | | |
|---|---|---|---|---|
| 2011/0235734 | A1* | 9/2011 | Kenington | 375/267 |
| 2011/0235743 | A1* | 9/2011 | Lee et al. | 375/295 |
| 2011/0317657 | A1* | 12/2011 | Chmiel | H04L 5/001 370/331 |

OTHER PUBLICATIONS

Office Action issued in corresponding Japanese Application No. 2010-250874, mailed Aug. 20, 2013 (6 pages).
International Search Report issued in PCT/JP2011/075659 mailed Dec. 6, 2011 (4 pages).
NTT DOCOMO, "Signaling to Support CSI-RS," 3GPP TSG RAN WG1 Meeting #62bis; R1-105432; Xian, China; Oct. 11-15, 2010 (7 pages).
Huawei, HiSilicon, "The possible restrictions on the configuration of almost blank subframes in Macro-Pico deployments," 3GPP TSG RAN WG1 Meeting #62bis; R1-105150; Xi'an, China; Oct. 11-15, 2010 (5 pages).
Huawei, HiSilicon, "Remaining issues on CSI RS signalling," 3GPP TSG RAN WG1 Meeting #62bis; R1-105131; Xi'an, China; Oct. 11-15, 2010 (11 pages).
Alcatel-Lucent Shanghai Bell, Alcatel-Lucent, "Remaining aspects of CSI-RS parameters and signaling," 3GPP TSG RAN WG1 Meeting #62bis; R1-105201; Xi'an, China; Oct. 11-15, 2010 (3 pages).
3GPP TS 36.300 V8.10.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Sep. 2009 (147 pages).
Decision to Grant a Patent issued in corresponding Japanese Application No. JP2010-250874 mailed on Nov. 19, 2013. (4 pages).
Office Action issued in corresponding Canadian Application No. 2815681, mailed Jun. 1, 2016 (4 pages).
Office Action issued in corresponding Canadian Application No. 2,815,681, mailed Jun. 30, 2015 (4 pages).

* cited by examiner

SUBFRAMES

UE DOES NOT MEASURE CSI-RS IN THE 4th AND 9th SUBFRAMES

↓ NW STOPS PAGING IN THE 4th SUBFRAME (MODIFICATION NOTIFICATION)

AFTER MODIFICATION NOTIFICATION, UE DETERMINE TO MEASURE CSI-RS IN THE 4th SUBFRAME

↓ NW STARTS TO TRANSMIT CSI-RS IN THE 4th SUBFRAME

UE MEASURES CSI-RS IN THE 4th SUBFRAME

USER TERMINAL, RADIO BASE STATION AND RADIO COMMUNICATION METHOD

TECHNICAL FIELD

The present invention relates to a user terminal, a radio base station and a radio communication method in a radio communication system where a micro cell is provided in a macro cell.

BACKGROUND ART

There has been defined in the standards organization 3GPP a radio communication system employing an LTE (Long Term Evolution) scheme (hereinafter referred to as "LTE system") as successor system to the UMTS (Universal Mobile Telecommunications System). Now in 3GPP, a radio communication system employing an LTE-Advanced scheme (hereinafter referred to as "LTE-A system") has been under study as a successor system to the LTE system.

In the LTE-A system, there has been studied HetNet (Heterogeneous Network) in which a micro cell (for example, pico cell or femto cell) having a local coverage of about several-ten-meter radius is formed in a macro cell having a wide coverage of several-kilometer radius (for example, see Non Patent Literature 1).

In such HetNet, for the purpose of improving throughput of the whole system, it has been studied to perform CRE (Cell Range Expansion). In CRE, the range of the micro cell is expanded by adding an offset to reception power from a radio base station that forms the micro cell (hereinafter referred to as "micro base station"). Therefore, a user terminal positioned inside the expanded micro cell can be handed over from a radio base station that forms the macro cell (hereinafter referred to as "macro base station") to the micro base station.

Also, in such HetNet, the user terminal handed over to the micro base station by CRE suffers from large interference from the macro base station. Therefore, interference coordination has been under study to stop data transmission by the macro base station in some subframes thereby to reduce interference that the user terminal suffers from by the macro base station.

FIG. 1 is a diagram illustrating an example of interference coordination. As illustrated in FIG. 1, in subframes in which the macro base station performs data transmission (first and third subframes from the left), reception power of the user terminal from the micro base station is lowered because it suffers from interference from the macro base station. On the other hand, in subframes where the macro base station stops data transmission (second and fourth subframes from the left), reception power of the user terminal from the micro base station is increased because it does not suffer from interference from the macro base station. Here, in subframes where the data transmission is stopped (hereinafter referred to as "transmission stopped subframes), data transmission may not be stopped completely or a small amount of data may be transmitted as far as interference to the user terminal falls within acceptable limits. As a transmission stopped subframe, for example, a MBSFN (MBMS (Multimedia Broadcast and Multicast Service) over a Single Frequency Network) subframe or an ABS (Almost Blank Subframe) may be used.

When setting an ABS, it has been studied to set the ABS at intervals of 8 msec, as illustrated in FIG. 3, in consideration of the period 8 msec of UL HARQ (Uplink Hybrid ARQ) in a macro cell/micro cell (pico cell) (the ABSs are indicated by open boxes in radio frames of the macro cell in FIG. 3). In this case, the micro base station (pico base station) transmits CSI-RSs (Channel State Information-Reference Signals) at intervals of 8 msec where the ABSs are set in the macro base station.

When the CSI-RSs are thus transmitted at intervals of 8 msec, paging subframes (subframes to communicate modification in system by paging) (at least one subframe out of subframes #0, #4, #5 and #9 in each radio frame) transmitted at intervals of 10 msec collide with subframes including CSI-RSs, and if they are transmitted as they are, there may arise collision between them. Note that in FIG. 3, there may arise collision in subframes #0 and #4.

Paging is provided to notify incoming calls, modification in system or the like and requires higher quality. Therefore, it has been proposed to prevent the pico base station from transmitting CSI-RSs in all the subframes (subframes #0, #4, #5 and #9) where there may be collision of the paging subframes and CSI-RS subframes.

CITATION LIST

Non Patent Literature

Non-Patent Literature 1: 3GPP, TS36.300
Non-Patent Literature 2: 3GPP, TSG-RAN WG1 Meeting #62bis "Remaining aspects of CSI-RS parameters and signaling"

SUMMARY OF INVENTION

Technical Problem

By the way, pagings are not transmitted in all the subframes #0, #4, #5 and #9 and are sometimes transmitted in some of the subframes #0, #4, #5 and #9. Accordingly, if CSI-RSs are not transmitted in the subframes #0, #4, #5 and #9 though pagings are transmitted only in some of the subframes #0, #4, #5 and #9, it cannot be said that the CSI-RSs are transmitted effectively and efficient UL HARQ cannot be expected.

The present invention was carried out in view of the foregoing and aims to provide a user terminal, a radio base station and a radio communication method capable of transmitting a paging to the user terminal with high quality in HetNet, transmitting a CSI-RS effectively and performing UL HARQ efficiently.

Solution to Problem

The present invention provides a user terminal for receiving a signal which includes a CSI-RS (Channel State Information-Reference Signal) subframe including CSI-RS and a paging subframe including modification notification information indicating modification in system information from a micro base station which is arranged in a macro cell formed by a macro base station and forms a smaller micro cell than the macro cell, the use terminal comprising: a receiving section configured to receive the signal; and a subframe determining section configured to, when the CSI-RS subframe and the paging subframe collide with each other, determine a CSI-RS subframe to measure a CSI-RS based on the modification notification information of the signal.

Further, the present invention provides a user terminal for receiving a signal which includes a CSI-RS (Channel State Information-Reference Signal) subframe including CSI-RS and a paging subframe including modification notification information indicating modification in system information, and a control signal, from a micro base station which is arranged in a macro cell formed by a macro base station and forms a smaller micro cell than the macro cell, the use terminal comprising: a receiving section configured to receive the signal and the control signal; and a subframe determining section configured to determine a CSI-RS subframe to measure a CSI-RS based on the control signal when the CSI-RS subframe and the paging subframe collide with each other.

The present invention provides a radio base station which is arranged in a macro cell formed by a macro base station and forms a smaller micro cell than the macro cell, the radio base station transmitting, to a user terminal, a signal which includes a CSI-RS (Channel State Information-Reference Signal) subframe including CSI-RS and a paging subframe including modification notification information indicating modification in system information, the radio base station comprising: a broadcast information generating section configured to generate broadcast information about a CSI-RS subframe to measure a CSI-RS; and a transmitting section configured to transmit the broadcast information and the signal to the user terminal.

The present invention provides a radio communication method comprising the steps of: transmitting a signal which includes a CSI-RS (Channel State Information-Reference Signal) subframe including a CSI-RS and a paging subframe including modification notification information indicating modification in system information, from a micro base station that is arranged in a macro cell formed by a macro base station and forms a smaller micro cell than the macro cell, to a user terminal; and in the user terminal, determining a CSI-RS subframe to measure a CSI-RS based on the modification notification information of the signal when the CSI-RS subframe and the paging subframe collide with each other.

Further, the present invention provides a radio communication method comprising the steps of: transmitting a signal which includes a CSI-RS (Channel State Information-Reference Signal) subframe including a CSI-RS and a paging subframe including modification notification information indicating modification in system information and a control signal indicating not to measure a CSI-RS when the CSI-RS subframes and the paging subframes collide with each other, from a micro base station that is arranged in a macro cell formed by a macro base station and forms a smaller micro cell than the macro cell, to a user terminal; and in the user terminal, determining a CSI-RS subframe to measure a CSI-RS based on the control signal when the CSI-RS subframe and the paging subframe collide with each other.

Advantageous Effects of Invention

According to the present invention, in HetNet, as the CSI-RS is transmitted in consideration of a subframe where the paging is transmitted, that is, the CSI-RS is transmitted in a subframe other than the subframe where the paging is transmitted, it is possible to transmit the paging to the user terminal with high quality, transmit the CSI-RS effectively and transmit UL HARQ efficiently.

DESCRIPTION OF EMBODIMENTS

The following description will be made by way of example where a pico cell is used as a micro cell, however, this is by no means limiting and for example, the micro cell may be a femto cell or a cell formed by a relay node. And, the ABS is taken as an example of a transmission stopped subframe, and this is by no means limiting and for example, it may be a MBSFN subframe.

Figure 1:
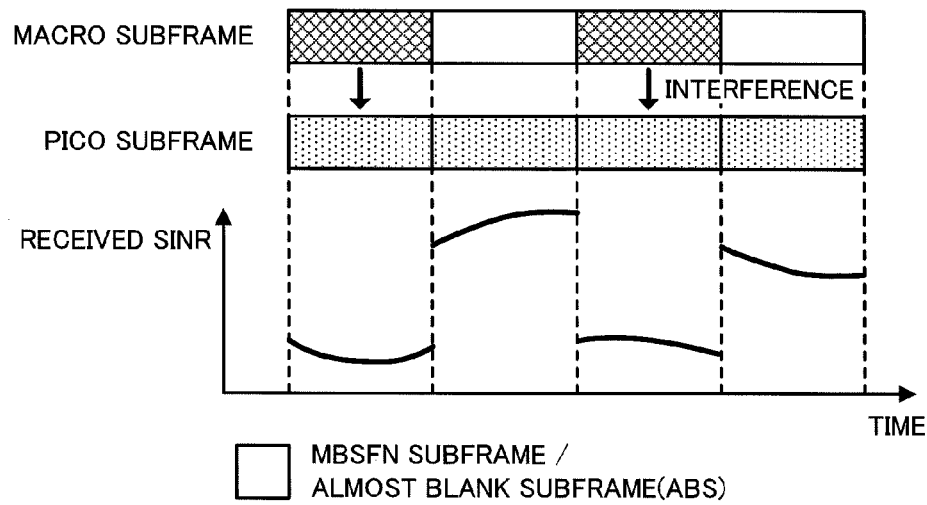
FIG. 1 is a diagram illustrating an example of interference coordination.
Figure 2:
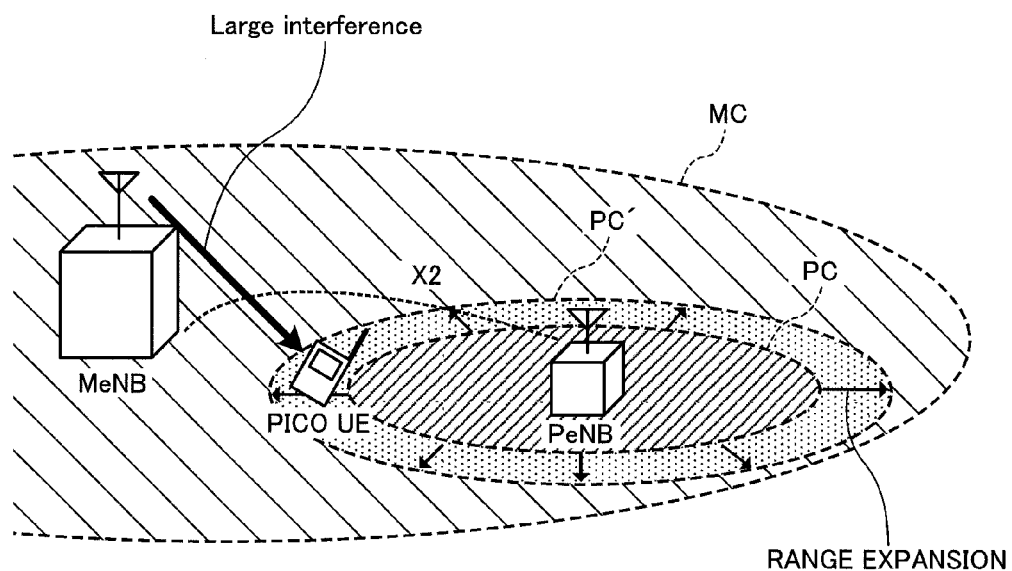
FIG. 2 is a schematic diagram illustrating a configuration of a radio communication system to which a notification method according to the present invention is applied.
Figure 3:
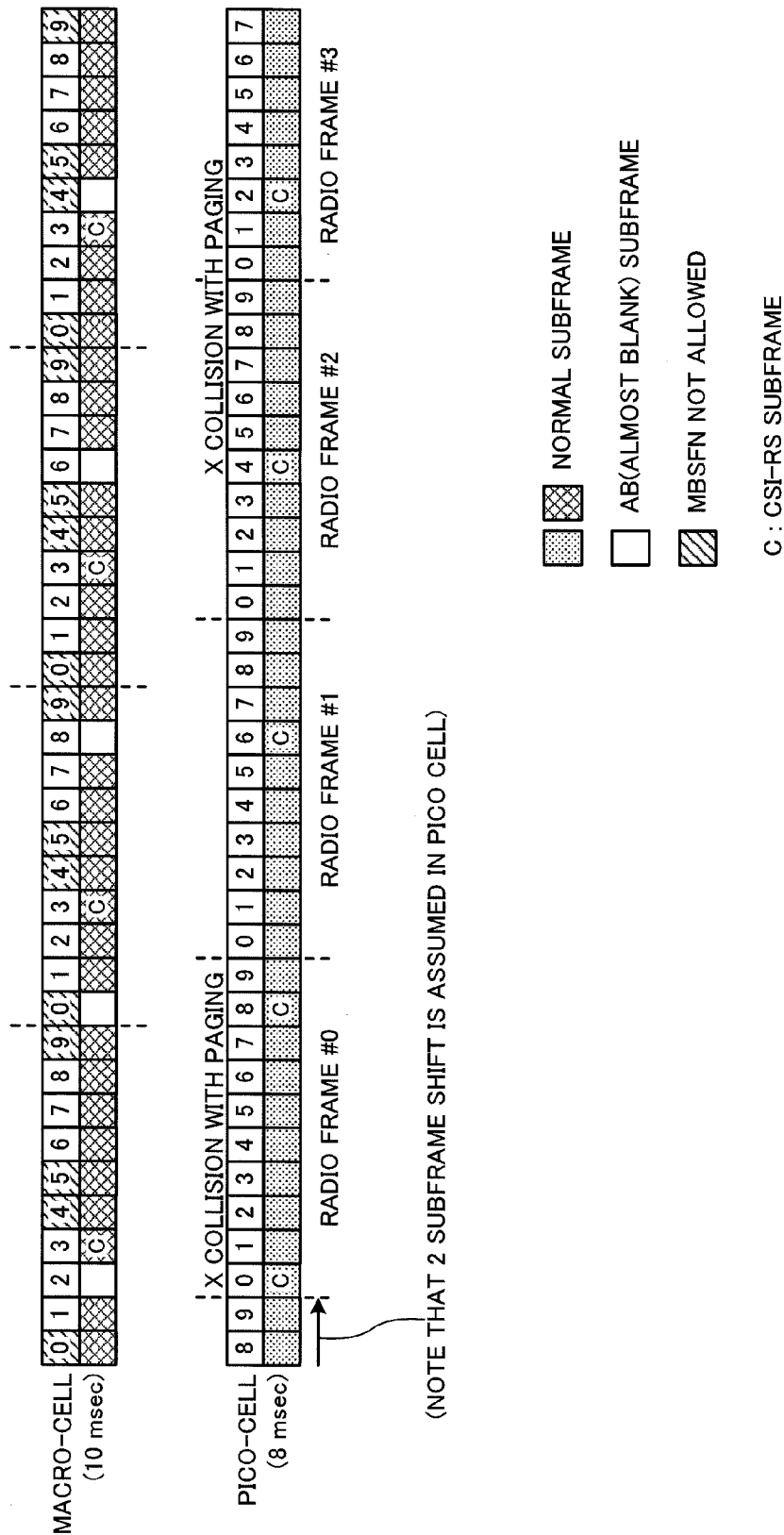
FIG. 3 is a diagram illustrating an example of an ABS pattern.

FIG. 2 is a schematic diagram illustrating the configuration of a radio communication system according to the present invention. As illustrated in FIG. 2, the radio communication system according to the present invention includes a radio base station that forms a macro cell MC (hereinafter referred to as "macro base station") MeNB (Macro evolved NodeB), a radio base station that forms a pico cell PC (hereinafter referred to as "pico base station") PeNB (Pico evolved NodeB) and a user terminal UE (User Equipment).

As illustrated in FIG. 2, the macro base station MeNB and the pico base station PeNB are connected to each other via a wired X2 interface. And, the macro base station MeNB and the pico base station PeNB are both connected to a core network (not shown). Further, the macro base station MeNB and the pico base station PeNB share at least a part of a radio frequency band.

In the radio communication system illustrated in FIG. 2, when the user terminal UE is located inside the pico cell PC, the reception power from the pico base station PeNB becomes greater than the reception power from the macro base station MeNB, and therefore, the user terminal is connected to the pico base station PeNB. On the other hand, when the user terminal UE is located outside the pico cell PC, the reception power from the pico base station PeNB becomes smaller than the reception power from the macro base station MeNB, and therefore, the user terminal UE is connected to the macro base station MeNB.

Further, in the radio communication system illustrated in FIG. 2, CRE (Cell Range Expansion) is performed. In CRE, an offset is added to the reception power from the pico base station PeNB. Therefore, when the user terminal UE is located outside the pico cell PC but inside an expanded pico cell PC', the reception power (added with the offset) from the pico base station PeNB becomes greater than the reception power from the macro base station MeNB. Therefore, when the user terminal UE is located even outside the pico cell PC but inside the expanded pico cell PC', the user terminal UE can be connected to the pico base station PeNB and it can be handed over from the macro base station MeNB to the pico base station PeNB. In the following description, the user terminal UE connected to the pico base station PeNB is called pico terminal UE and the user terminal UE connected to the macro base station MeNB is called macro terminal UE, but they have the same configurations.

In the above-described HetNet radio communication system, as described above, paging subframes at intervals of 10 msec collide with CSI-RS subframes at intervals of 8 msec, and if they are transmitted as they are, there may arise collision between them. In this case, pagings are transmitted in the subframes #0, #4, #5 and #9, but, they are not always transmitted in the subframes #0, #4, #5 and #9 and they may be transmitted only in some of the subframes #0, #4, #5 and #9. In such a case, information as to which subframe to transmit paging is included in a broadcast signal. Therefore, if CSI-RSs are not transmitted in the subframes #0, #4, #5 and #9 even though pagings are only transmitted in some of the subframes #0, #4, #5 and #9, it would be hindrance to effective transmission of CSI-RSs and efficient performance of UL HARQ.

Noting this point, the present inventors have found that by transmitting CSI-RSs in subframes other than the subframes where pagings are transmitted, it is possible to transmit pagings to the user terminal with high quality, transmit CSI-RSs effectively and to perform UL HARQ efficiently and finally completed the present invention.

In a first aspect of the present invention, the user terminal UE determines which paging subframe is used to measure a CSI-RS, in accordance with system information included in the paging.

As to which subframes are used to transmit pagings, the user terminal can recognize from a broadcast channel signal (System information). Accordingly, the user terminal UE recognizes which subframes are used to transmit pagings from the broadcast channel signal, and when a certain CSI-RS subframe (a subframe including a CSI-RS) and a certain paging subframe (a subframe including a paging) collide with each other, the user terminal determines which subframe is used to measure a CSI-RS. For example, in a colliding subframe, the CSI-RS is not measured. In this case, the pica base station usually does not transmit the CSI-RS in the subframe.

That is, in the first aspect of the present invention, the pico base station transmits, to the user terminal, a signal including CSI-RS subframes with CSI-RSs and paging subframes with modification notification information indicating modification in system information, and when the CSI-RS subframes and the paging subframes collide with each other, the user terminal determines a CSI-RS subframe to measure a CSI-RS based on the modification notification information.

In the first aspect of the present invention, when a paging is stopped in a subframe where the paging has been performed, the user terminal determines to define a specific paging subframe as a CSI-RS subframe to measure a CSI-RS, based on modification notification information indicating that paging is not performed in the specific paging subframe.

Figure 4A:
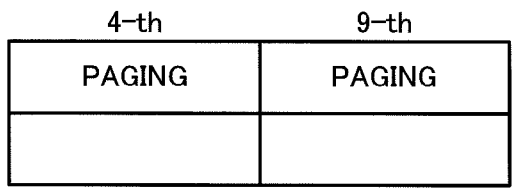
FIG. 4 provides diagrams for explaining a radio communication method according to an embodiment 1 of the present invention.

Specifically, this method takes the steps illustrated in FIG. 4. Here, pagings are performed in the subframes #4 and #9 and it is assumed that there is high possibility that these subframes collide with the CSI-RS subframes. First, the user terminal UE does not measure a CSI-RS as pagings are performed in the subframes #4 and #9 (FIG. 4A). Then, the user terminal UE refers to the broadcast channel signal to recognize that the pagings are performed in the subframes #4 and #9.

Figure 4B:
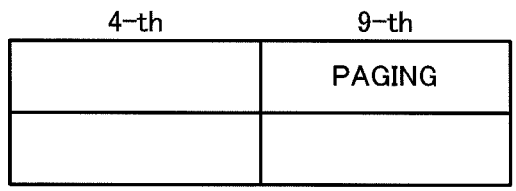

Paging in the subframe #4 is stopped at the pico base station side (network side), and modification notification about this stop is received by the user terminal. Then, the user terminal UE determines to measure a CSI-RS in the subframe #4 (the subframe #4 is defined as a CSI-RS subframe to measure a CSI-RS) (FIG. 4B).

Figure 4C:
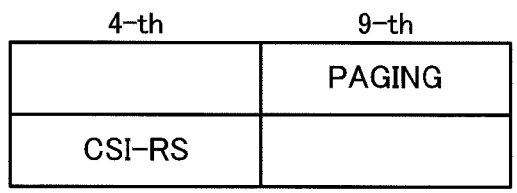

Then, when the CSI-RS is started to be transmitted in the subframe #4 at the pico base station side (network side), the user terminal UE measures the CSI-RS in the subframe #4 (FIG. 4C).

In the first aspect of the present invention, when paging is started in the subframe where paging has not been performed, the user terminal determines not to define a specific paging subframe as a CSI-RS subframe to measure a CSI-RS, based on modification notification information indicating that paging is performed in the specific paging subframe.

Figure 5A:
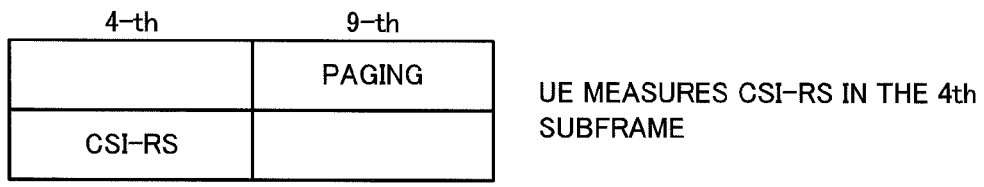
FIG. 5 provides diagrams for explaining the radio communication method according to the embodiment 1 of the present invention.

Specifically, this method takes the steps as illustrated in FIG. 5. Here, paging is performed in the subframe #9 and there is a possibility that this subframe collide with the CSI-RS subframe. First, as the paging is not performed in the subframe #4, the user terminal measures the CSI-RS (FIG. 5A). As the paging is performed in the subframe #9, the user terminal does not measure the CSI-RS. The user terminal UE refers to the broadcast channel signal to recognize that the pagings are performed in the subframe #9.

Figure 5B:
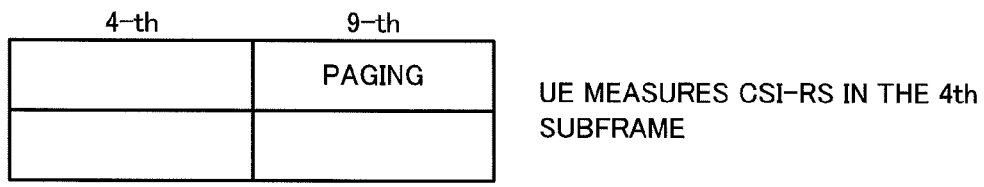

The pico base station (network side) stops transmission of the CSI-RS in the subframe #4. Then, the user terminal UE measures the CSI-RS of the subframe #4 (FIG. 5B).

Figure 5C:
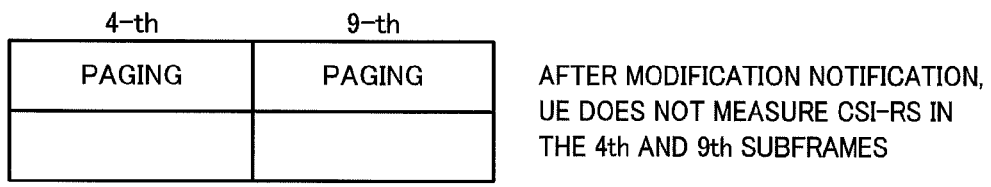

Next, paging is started in the subframe #4 at the pico base station (network) side, and a modification notification about this change is received by the user terminal UE. Then, the user terminal UE determines not to measure CSI-RS in the subframes #4, #9 (subframes #4, #9 are defined as subframes not to measure CSI-RS) (FIG. 5C).

In a second aspect of the present invention, it is the pico base station side (network side) that determines which paging subframe is used to measure a CSI-RS and notify it to the user terminal. That is, as the pico base station recognizes which subframe is used to perform paging out of the subframes #0, #4, #5 and #9 and informs the user terminal of broadcast information to exclude a subframe where the paging is performed.

That is, in the second aspect of the present invention, the pico base station transmits, to the user terminal, a signal which includes CSI-RS subframes including CSI-RSs and paging subframes including modification notification information indicating modification in system information and a control signal indicating not to measure CSI-RS when the CSI-RS subframes and the paging subframes collide with each other. When the CSI-RS subframes and the paging subframes collide with each other, the user terminal determines a CSI-RS subframe to measure the CSI-RS based on the control signal.

In the second aspect of the present invention, when paging is stopped in the subframe where paging has been performed, the user terminal determines to define a specific paging subframe as a CSI-RS subframe to measure a CSI-RS, by the control signal indicating that the CSI-RS may be measured in the specific paging subframe. Here, it is assumed that the control signal is a broadcast channel signal (broadcast information).

Specifically, this method takes the steps as illustrated in FIG. 6. Here, the paging is performed in the subframes #4 and #9 and there is a possibility that they may collide with CSI-RS subframes. First, the user terminal UE does not measure the CSI-RS as the pagings are performed in the subframes #4 and #9 (FIG. 6A). Then, the user terminal UE refers to the broadcast channel signal to recognize that the pagings are performed in the subframes #4 and #9.

Figure 6A:
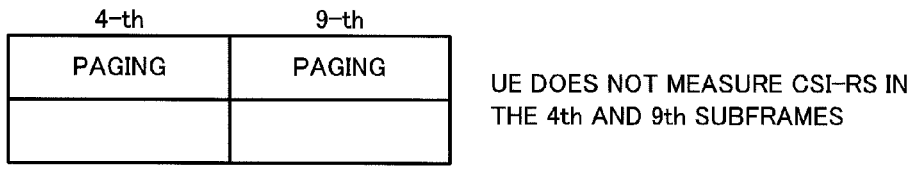
FIG. 6 provides diagrams for explaining a radio communication method according to an embodiment 2 of the present invention.
Figure 6B:
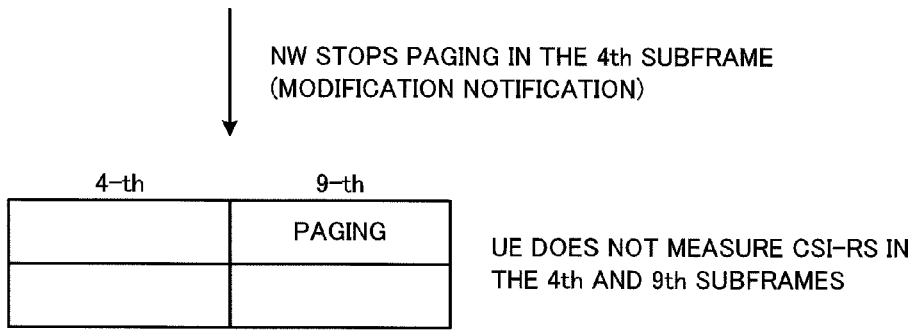

The pico base station side (network side) stops paging in the subframe #4 and the user terminal UE receives a modification notification about this stop. At this time, the user terminal UE does not measure a CSI-RS yet (FIG. 6B).

Figure 6C:
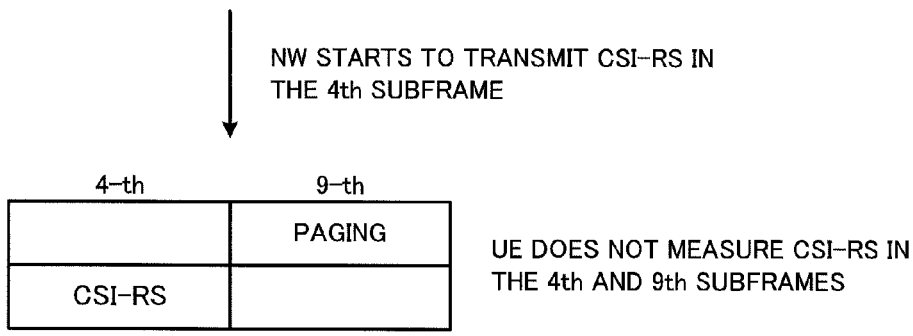
Figure 6D:
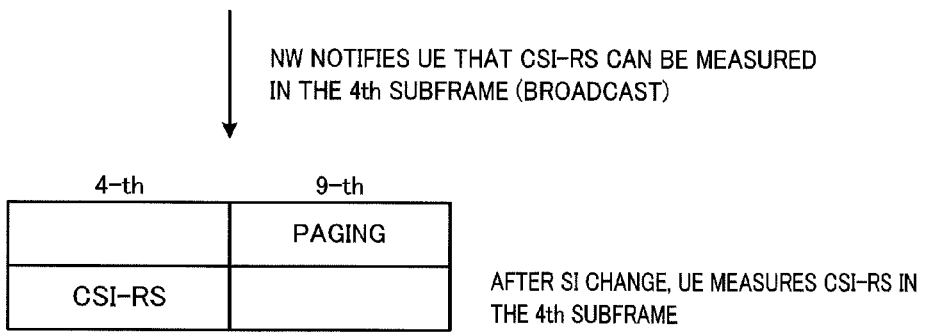

Then, the pico base station side (network side) starts to transmit a CSI-RS in the subframe #4. At this moment, the user terminal UE does not measure the CSI-RS yet (FIG. 6C). Then, when receiving broadcast information indicating that the CSI-RS may be measured in the subframe #4 from the pico base station side (network side), the user terminal UE measures the CSI-RS in the subframe #4 after the system information is modified (FIG. 6D).

In the second aspect of the present invention, when paging is started in a subframe where paging has not been performed, the user terminal determines not to define a specific paging subframe as a CSI-RS subframe to measure a CSI-RS, by broadcast information indicating not to measure the CSI-RS in the specific paging subframe (to perform paging in the subframe #4).

Specifically, this method takes the steps illustrated in FIG. 7. Here, the paging is performed in the subframe #9 and there is a possibility that this subframe collide with the CSI-RS subframe. First, the user terminal UE measures a CSI-RS as the paging is not performed in the subframe #4 (FIG. 7A). As the paging is performed in the subframe #9, the user terminal does not measure CSI-RS. The user terminal UE refers to the broadcast channel signal to recognize that the pagings are performed in the subframe #9.

Figure 7A:
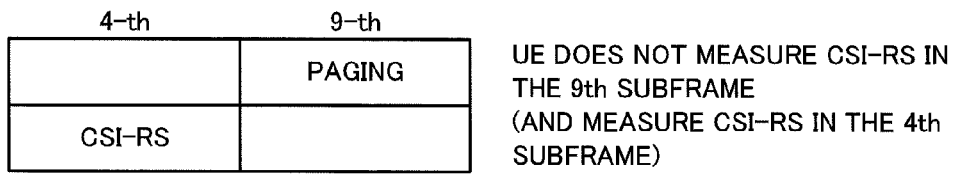
FIG. 7 provides diagrams for explaining the radio communication method according to the embodiment 2 of the present invention.
Figure 7B:
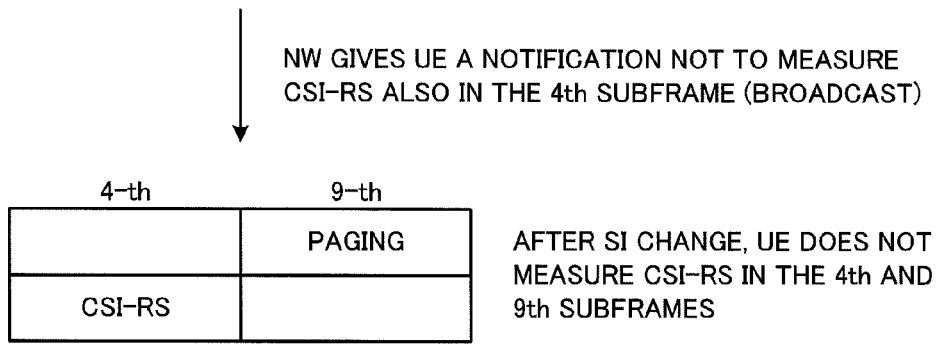

Next, receiving broadcast information indicating not to measure CSI-RS in the subframe #4 (to perform paging in the subframe #4) from the pico base station side (network side), the user terminal UE determines not to measure CSI-RS in the subframes #4 and #9 (define the subframe #4 as a subframe not to measure CSI-RS) after the system information is modified (FIG. 7B).

Figure 7C:
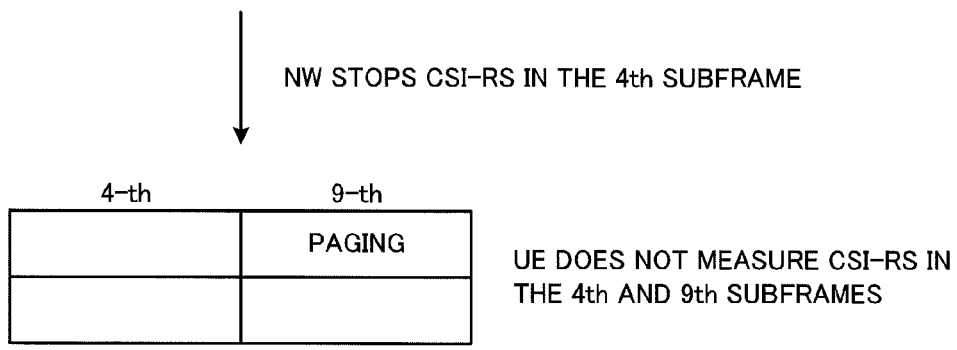

Then, transmission of the CSI-RS in the subframe #4 is stopped at the pico base station side (network side). At this moment, the user terminal UE does not measure CSI-RS in the subframes #4 and #9 (FIG. 7C).

Figure 7D:
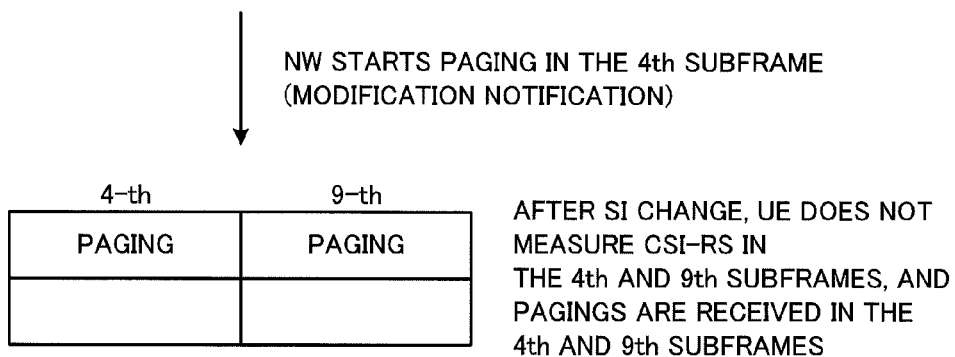

After that, the pico base station side (network side) starts paging in the subframe #4 and the user terminal UE receives a modification notification of this start. After the system information is modified, the user terminal UE receives pagings in the subframes #4 and #9. And, the user terminal UE does not measure CSI-RSs in the subframes #4 and #9 (FIG. 7D).

In this way, according to the above-described first and second aspects, in HetNet, CSI-RSs are transmitted in consideration of subframes where pagings are transmitted, that is, they are transmitted in subframes other than the subframes where pagings are transmitted. With this structure, it is possible to transmit pagings to the user terminal with high quality, transmit CSI-RSs effectively and perform UL HARQ efficiently.

The following description is made in detail about embodiments of the present invention, with reference to the accompanying drawings.

Embodiment 1

In this embodiment, description is made about the case (first aspect) where the user terminal UE determines which paging subframe is used to measure a CSI-RS based on system information contained in a paging.

The schematic structure of a radio communication system according to the embodiment 1 of the present invention is the same as that illustrated in FIG. 2. Each apparatus illustrated in FIG. 2 (that is, a macro base station MeNB, a pico base station PeNB and a pico terminal UE) has hardware such as an antenna, a communication interface, a processor, a memory and a transmission/reception circuit and the memory stores software modules to be executed by the processor. And, the functional structure of each apparatus described later may be realized by the above-described hardware, by software modules executed by the processor, or may be realized in their combination.

Figure 8:
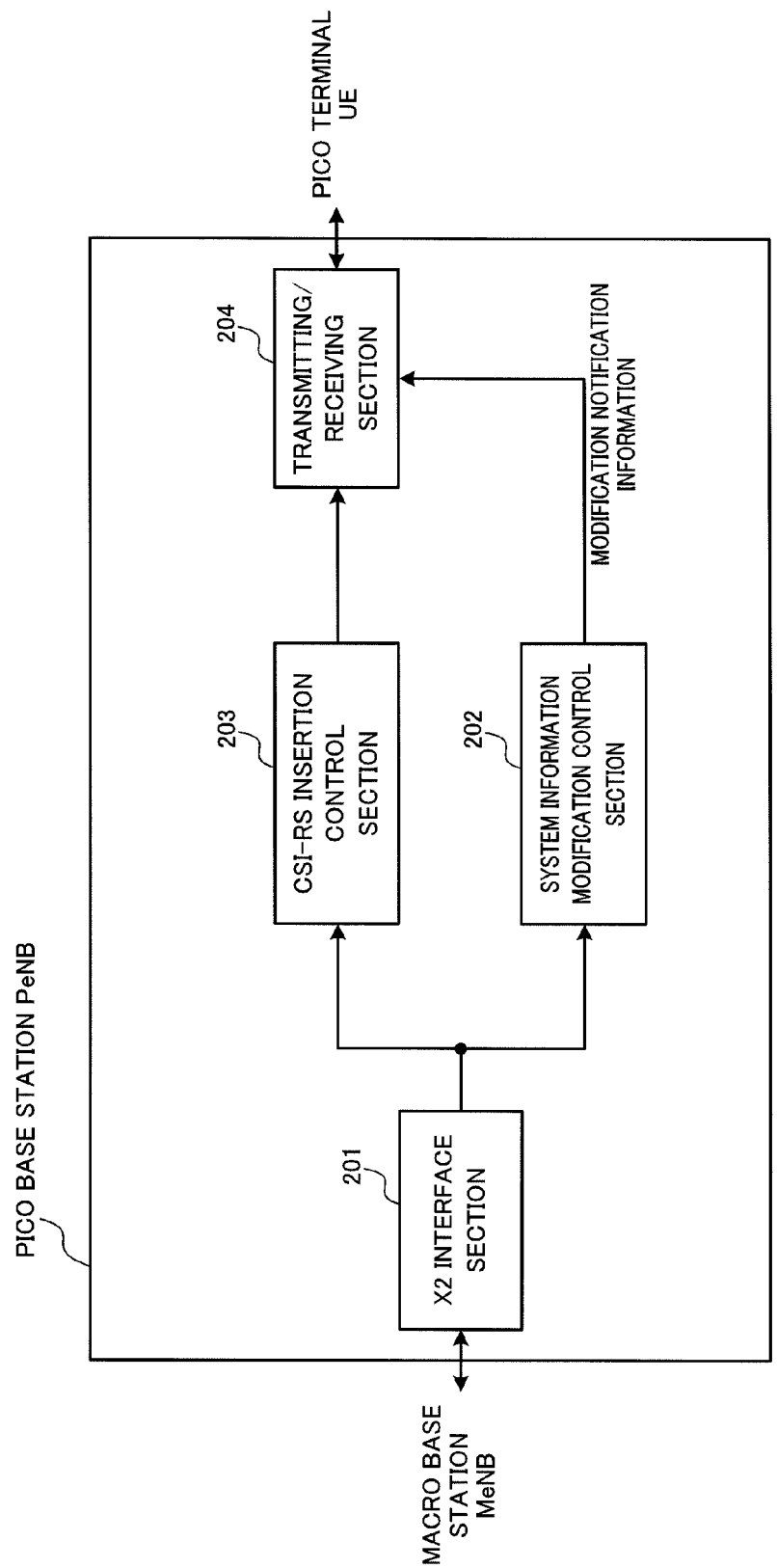
FIG. 8 is a functional diagram illustrating a pico base station according to the embodiment 1 of the present invention.

FIG. 8 is a diagram illustrating the functional structure of the pica base station according to the embodiment 1 of the present invention. As illustrated in FIG. 8, the pico base station PeNB has an X2 interface section (receiving section) 201, a system information modification control section 202, a CSI-RS insertion control section 203 and a transmitting/receiving section 204.

The X2 interface section 201 performs transmission and reception of signals with the macro base station MeNB via the X2 interface.

The system information modification control section 202 determines a subframe to perform paging in accordance with communication conditions (determine a paging subframe), and when there is a change in subframe to perform paging, it generate modification notification information about which subframe to perform paging. The system information modification control section 202 outputs the modification notification information to the transmitting/receiving section 204.

The CSI-RS insertion control section 203 generates a CSI-RS and determines which subframe to insert the CSI-RS (determine a CSI-RS subframe). The CSI-RS insertion control section 203 outputs the CSI-RS to the transmitting/receiving section 204.

The transmitting/receiving section 204 performs transmission and reception of radio signals with the pico terminal (user terminal). Specifically, the predetermined transmission processing on the CSI-RS, modification notification information and other data to generate transmission signals, which are transmitted to the pico terminal UE.

Figure 9:
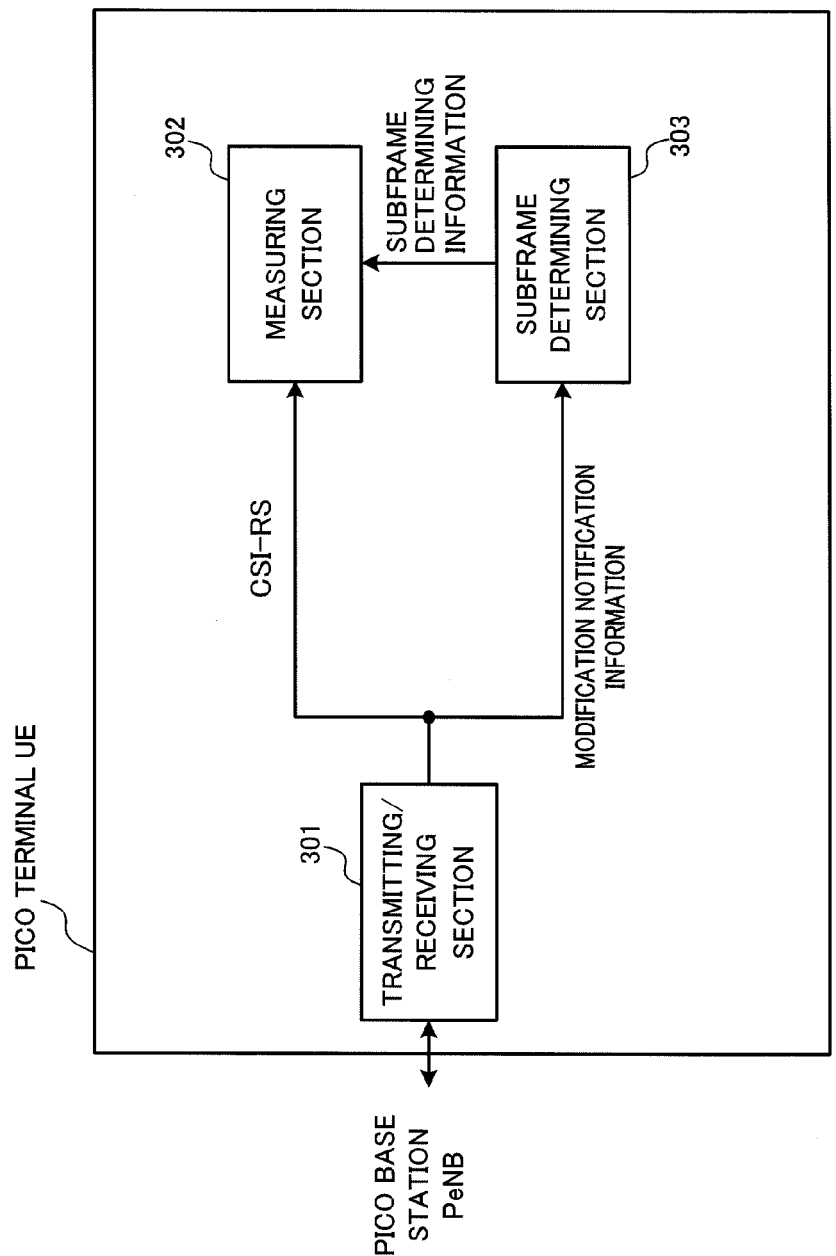
FIG. 9 is a functional diagram illustrating a user terminal according to the embodiment 1 of the present invention.

FIG. 9 is a diagram illustrating the functional structure of the pico terminal according to the embodiment 1 of the present invention. As illustrated in FIG. 9, the pico terminal UE has a transmitting/receiving section (receiving section) 301, a measuring section 302 and a subframe determining section 303.

The transmitting/receiving section 301 performs transmission and reception of radio signals with the pico base station PeNB. Specifically, the transmitting/receiving section 301 receives signals transmitted from the pico base station PeNB, more specifically, signals including subframes with CSI-RSs and paging subframes. Further, the transmitting/receiving section 301 receives modification notification information indicating modification in system information (change in paging subframe etc.).

The measuring section 302 measures channel quality with use of the CSI-RS received by the transmitting/receiving section 301. The measuring section 302 measures the channel quality with use of the CSI-RS based on subframe determination information output from the subframe determining section 303 (information about which subframe is used to measure the CSI-RS or information about which subframe is not used to measure the CSI-RS).

The subframe determining section 303 determines a subframe to measure the CSI-RS or a subframe not to measure the CSI-RS based on the modification notification information received by the transmitting/receiving section 301, and outputs the determined information (subframe determination information) to the measuring section 302. The subframe determining section 303 determines to measure the CSI-RS in a subframe where paging is stopped, included in the modification notification information (define the subframe where paging is stopped as a subframe to measure a CSI-RS). Or, the subframe determining section 303 determines not to measure a CSI-RS in a subframe where paging is started, included in the modification notification information (define the subframe where paging is started as a subframe not to measure a CSI-RS).

In the thus-structured radio communication system, first, the pico base station PeNB transmits, to the user terminal UE, a signal which includes CSI-RS subframes including CSI-RSs and paging subframes including modification notification information indicating modification in system information. The user terminal UE determines a CSI-RS subframe to measure the CSI-RS based on the modification notification information when the CSI-RS subframes and the paging subframes collide with each other.

For example, when the paging is stopped in a subframe where the paging has been performed at the pico base station side (network side), the modification notification information about this stop is generated by the system information modification control section 202, and this modification notification information is transmitted to the user terminal UE by paging. In the user terminal, the subframe determining section 303 determines to measure the CSI-RS in the subframe where the paging is stopped based on the received modification notification information. And, the measuring section 302 measures the CSI-RS in the subframe where the paging is stopped.

Further, when the paging is started in the subframe where paging has been performed in the pico base station side (network side), the modification notification information about this start is generated by the system information modification control section 202 and this modification notification information is transmitted to the user terminal UE by paging. In the user terminal, the subframe determining section 303 determines not to measure CSI-RS in the subframe where the paging is started, based on the received modification notification information. Then, the measuring section 302 does not measure the CSI-RS in the subframe where the paging is started.

Embodiment 2

In this embodiment, description is made about the case where the pico base station side (network side) determines which paging subframe is used to measure a CSI-RS and notifies the user terminal.

The schematic structure of a radio communication system according to the embodiment 2 of the present invention is the same as that illustrated in FIG. 2. Each apparatus illustrated in FIG. 2 (that is, a macro base station MeNB, a pico base station PeNB and a pico terminal UE) has hardware such as an antenna, a communication interface, a processor, a memory and a transmission/reception circuit and the memory stores software modules to be executed by the processor. And, the functional structure of each apparatus described later may be realized by the above-described hardware, by software modules executed by the processor, or may be realized in their combination.

Figure 10:
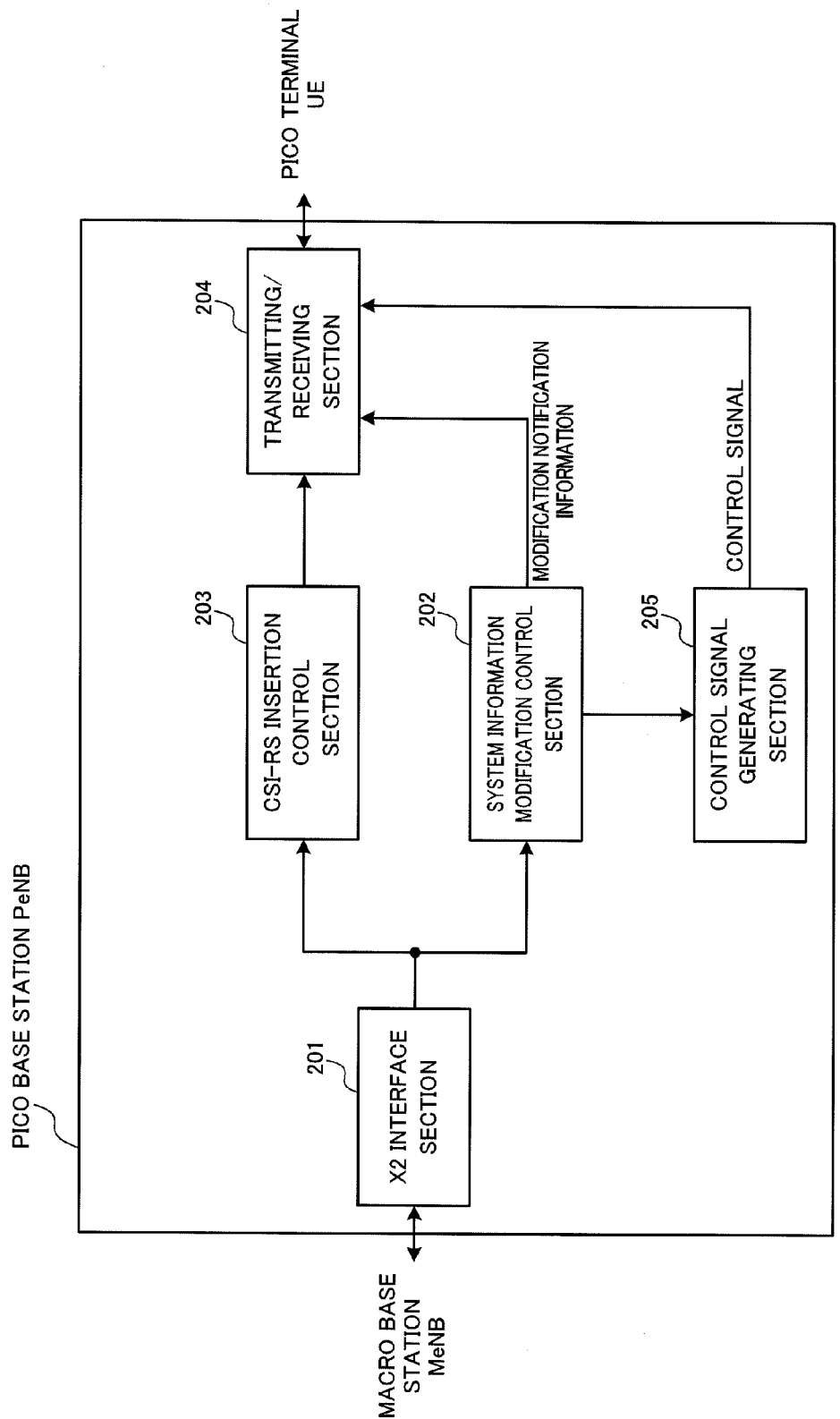
FIG. 10 is a functional diagram illustrating a pico base station according to the embodiment 2 of the present invention.

FIG. 10 is a diagram illustrating the functional structure of the pico base station according to the embodiment 2 of the present invention. As illustrated in FIG. 10, the pico base station PeNB has an X2 interface section (receiving section) 201, a system information modification control section 202, a CSI-RS insertion control section 203, a transmitting/receiving section 204 and a control signal generating section 205.

The X2 interface section 201 performs transmission and reception of signals with the macro base station MeNB via the X2 interface.

The system information modification control section 202 determines a subframe to perform paging in accordance with communication conditions (determine a paging subframe), and when there is a change in subframe to perform paging, it generates modification notification information about which subframe is used to perform paging. The system information modification control section 202 outputs the modification notification information to the transmitting/receiving section 204.

The CSI-RS insertion control section 203 generates a CSI-RS and determines which subframe to insert the CSI-RS (determine a CSI-RS subframe). The CSI-RS insertion control section 203 outputs the CSI-RS to the transmitting/receiving section 204.

The control signal generating section 205 generates a control signal indicating not to measure CSI-RS when the CSI-RS subframes and the paging subframes collide with each other, and outputs the control signal to the transmitting/receiving section 204. This control signal is a control signal indicating that CSI-RS may be measured in a specific paging subframe or a control signal indicating that a CSI-RS may not be measured in a specific paging subframe. Here, this control signal is a broadcast channel signal or an individual user channel signal (so-called layer 3 signal).

The transmitting/receiving section 204 performs transmission and reception of radio signals with the pico terminal (user terminal) UE. Specifically, the transmitting/receiving section 204 performs predetermined transmission processing on the CSI-RS, modification notification information and other data to generate transmission signals, which are transmitted to the pico terminal UE.

Figure 11:
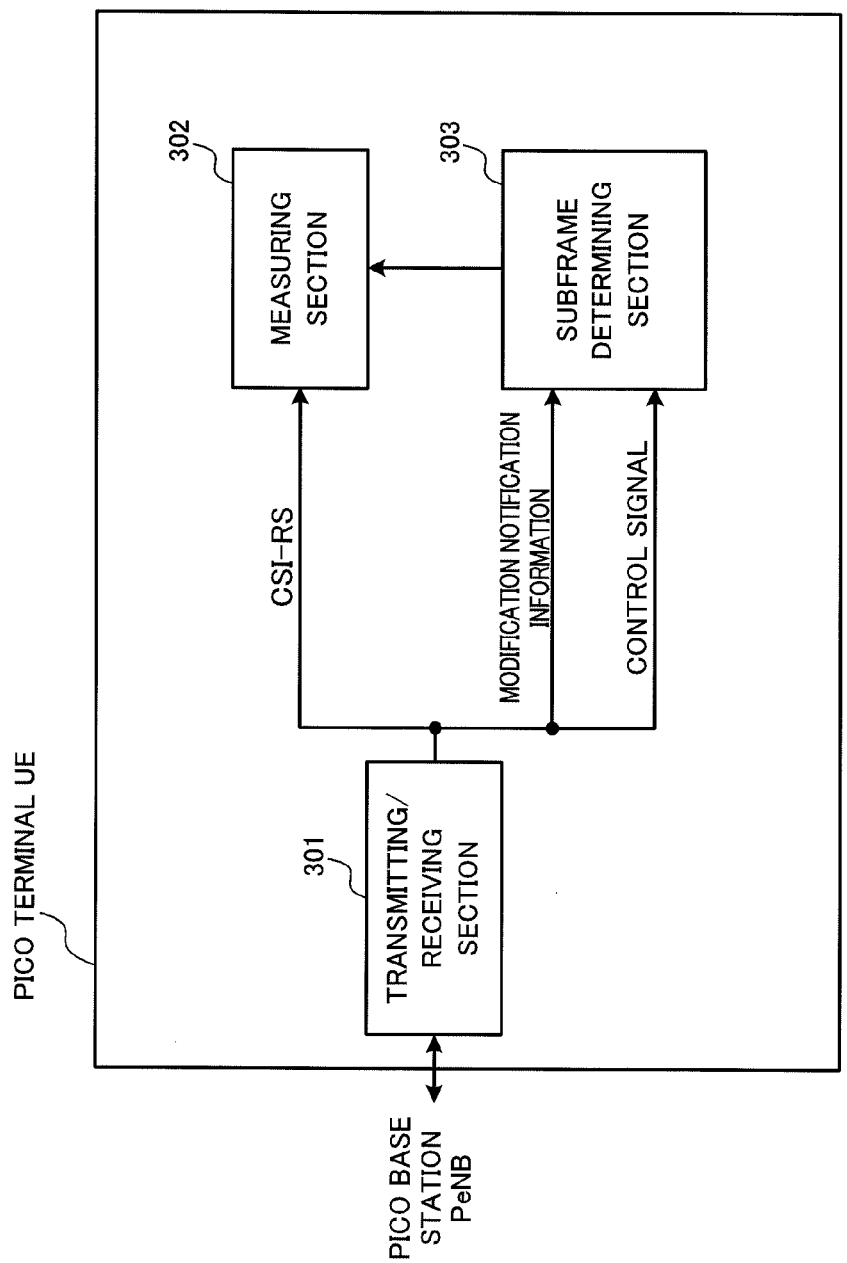
FIG. 11 is a functional diagram illustrating a user terminal according to the embodiment 2 of the present invention.

FIG. 11 is a diagram illustrating the functional structure of the pico terminal according to the embodiment 2 of the present invention. As illustrated in FIG. 11, the pico terminal UE has a transmitting/receiving section (receiving section) 301, a measuring section 302 and a subframe determining section 303.

The transmitting/receiving section 301 performs transmission and reception of radio signals with the pico base station PeNB. Specifically, the transmitting/receiving section 301 receives a signal transmitted from the pico base station PeNB, more specifically, a signal including subframes with CSI-RS and paging subframes and the control signal. Further, the transmitting/receiving section 301 receives modification notification information indicating modification in system information (change in paging subframe etc.).

The measuring section 302 measures channel quality with use of the CSI-RS received by the transmitting/receiving section 301. The measuring section 302 measures the channel quality with use of the CSI-RS based on subframe determination information output from the subframe determining section 303 (information about which subframe is used to measure the CSI-RS or information about which subframe is not used to measure the CSI-RS).

The subframe determining section 303 determines a subframe to measure a CSI-RS or a subframe not to measure a CSI-RS, based on the modification notification information and the control signal received by the transmitting/receiving section 301, and outputs this information (subframe determination information) to the measuring section 302. The subframe determining section 303 determines a subframe to measure or not to measure the CSI-RS in accordance with the control signal. For example, when the control signal is a control signal indicating that the CSI-RS may be measured in a specific paging subframe, it defines the specific paging subframe as a subframe to measure CSI-RS. Or, when the control signal is a control signal indicating that CSI-RS may not be measured in a specific paging subframe, it defines the specific paging subframe as a subframe not to measure the CSI-RS.

In the thus-structured radio communication system, first, the pico base station PeNB transmits, to the user terminal, a signal which includes CSI-RS subframes including CSI-RSs and paging subframes including modification notification information indicating modification in system information, and a control signal. When the CSI-RS subframes and the paging subframes collide with each other, the user terminal UE determines a CSI-RS subframe to measure the CSI-RS based on the control signal.

For example, when the paging is stopped in a subframe where the paging has been performed at the pico base station side (network side), the modification notification information about this stop is generated by the system information modification control section 202, and this modification notification information is transmitted to the user terminal by paging. And, in the pico base station side (network side), a control signal indicating which subframe may be used to measure the CSI-RS (subframe where paging is stopped) is transmitted to the user terminal UE. In the user terminal, the subframe determining section 303 determines to measure the CSI-RS in the subframe where the paging is stopped based on the received control signal. And, the measuring section 302 measures the CSI-RS in the subframe where the paging is stopped.

Further, when the paging is started in the subframe where paging has not been performed in the pico base station side (network side), the modification notification information about this start is generated by the system information modification control section 202 and this modification notification information is transmitted to the user terminal UE by paging. In the pico base station side (network side), a control signal indicating which subframe may not be used to measure the CSI-RS (subframe where paging is started) is transmitted to the user terminal UE. In the user terminal, the subframe determining section 303 determines not to measure the CSI-RS in the subframe where the paging is started, based on the received control signal. Then, the measuring section 302 does not measure the CSI-RS in the subframe where the paging is started.

The present invention has been described in detail by way of the above-described embodiments, however, a person having ordinary skill in the art would understand that the present invention is not limited to the embodiments described in this description. For example, the pico base station PeNB may be a femto base station forming a femto cell (Home eNodeB) or may be a relay station (Relay node). When the pico base station is the relay station, the relay station is connected to the macro base station MeNB via a radio link (backhaul link).

The present invention can be embodied in various modified or altered forms without departing from the spirit or scope of the present invention defined by claims. Accordingly, the description is given only for illustrative purposes and is by no means intended to limit the present invention. For example, the subframe numbers in the above-mentioned embodiments 1 and 2 are given only for illustrative purposes and may be changed to other numbers without limiting the present invention.

The disclosure of Japanese Patent Application No. 2010-250874, filed on Nov. 9, 2010, including the specification, drawings, and abstract, is incorporated herein by reference in its entirety.

The invention claimed is:

1. A user terminal for receiving a CSI-RS (Channel State Information-Reference Signal) periodically transmitted in a CSI-RS subframe and a paging transmitted in at least one of paging subframes, the user terminal comprising:
   a receiving section configured to receive system information indicating which subframe of the paging subframes to transmit the paging;
   a subframe determining section configured to determine a CSI-RS subframe to measure a CSI-RS based on the system information, when the CSI-RS subframe and the paging subframes collide with each other; and
   a measuring section that measures the CSI-RS determined by the subframe determining section,
   wherein the paging includes modification notification information indicating modification in the system information.

2. The user terminal of claim 1, wherein the subframe determining section is configured to determine a subframe in which the paging is not transmitted out of the paging subframes to be the CSI-RS subframe to measure the CSI-RS.

3. The user terminal of claim 1, wherein the subframe determining section is configured to determine a subframe in which the paging is transmitted out of the paging subframes not to be the CSI-RS subframe to measure the CSI-RS.

4. A radio communication method in a user terminal receiving a CSI-RS (Channel State Information-Reference Signal) periodically transmitted in a CSI-RS subframe and a paging transmitted in at least one of paging subframes, the radio communication method comprising the steps of:
   receiving system information indicating which subframe of the paging subframes to transmit the paging; and
   determining a CSI-RS subframe to measure a CSI-RS based on the system information, when the CSI-RS subframe and the paging subframes collide with each other; and
   measuring the determined CSI-RS subframe,
   wherein the paging includes modification notification information indicating modification in the system information.

5. The radio communication method of claim 4, wherein in the step of determining the CSI-RS subframe, a subframe in which the paging is not transmitted out of the paging subframes is determined to be the CSI-RS subframe to measure the CSI-RS.

6. The radio communication method of claim 4, wherein in the step of determining the CSI-RS subframe, a subframe in which the paging is transmitted out of the paging subframes is determined not to be the CSI-RS subframe to measure the CSI-RS.

7. A radio communication system having a user terminal that receives a CSI-RS (Channel State Information-Reference Signal) periodically transmitted in a CSI-RS subframe and a paging transmitted in at least one of paging subframes, comprising:
- a receiving section configured to receive system information indicating which subframe of the paging subframes to transmit the paging;
- a subframe determining section configured to determine a CSI-RS subframe to measure a CSI-RS based on the system information, when the CSI-RS subframe and the paging subframes collide with each other; and
- a measuring section that measures the CSI-RS determined by the subframe determining section,
- wherein the paging includes modification notification information indicating modification in the system information.

* * * * *